US007538864B2

(12) United States Patent
Golab et al.

(10) Patent No.: US 7,538,864 B2
(45) Date of Patent: May 26, 2009

(54) VEHICLE WHEEL ALIGNMENT SYSTEM SCANNED BEAM IMAGING SENSOR

(75) Inventors: Thomas J. Golab, St. Peters, MO (US); Daniel R. Dorrance, Ballwin, MO (US)

(73) Assignee: Hunter Engineering Company, Bridgeton, MO (US)

(*) Notice: Subject to any disclaimer, the term of this patent is extended or adjusted under 35 U.S.C. 154(b) by 80 days.

(21) Appl. No.: 11/388,076

(22) Filed: Mar. 23, 2006

(65) Prior Publication Data

US 2008/0007722 A1 Jan. 10, 2008

Related U.S. Application Data

(60) Provisional application No. 60/664,748, filed on Mar. 24, 2005.

(51) Int. Cl.
*G01C 1/00* (2006.01)
(52) U.S. Cl. .................................. 356/139.09; 356/155
(58) Field of Classification Search ............ 356/139.09, 356/155
See application file for complete search history.

(56) References Cited

U.S. PATENT DOCUMENTS

| 4,497,192 A * | 2/1985 | Reizig et al. ................... 72/203 |
| 4,745,469 A | 5/1988 | Waldecker et al. |
| 4,863,266 A | 9/1989 | Masuko et al. |
| 4,899,218 A | 2/1990 | Waldecker et al. |
| 5,000,567 A * | 3/1991 | Fleshner ..................... 356/28.5 |
| 5,268,731 A | 12/1993 | Fuchiwaki et al. |
| 5,532,816 A | 7/1996 | Spann et al. |
| 5,583,797 A * | 12/1996 | Fluegge et al. ............... 700/279 |
| 5,598,358 A * | 1/1997 | Gender et al. ................ 702/105 |
| 5,600,435 A | 2/1997 | Bartko et al. |
| 5,724,743 A * | 3/1998 | Jackson ....................... 33/288 |
| 5,731,870 A | 3/1998 | Bartko |
| 5,818,574 A | 10/1998 | Jones et al. |
| 5,841,829 A * | 11/1998 | Dolazza et al. ................. 378/4 |
| 5,978,077 A | 11/1999 | Koerner et al. |
| 6,064,750 A | 5/2000 | January et al. |
| 6,151,562 A | 11/2000 | Merrill |
| 6,178,358 B1 * | 1/2001 | Colarelli et al. ............... 700/16 |
| 6,298,284 B1 | 10/2001 | Burns, Jr. et al. |
| 6,412,183 B1 | 7/2002 | Uno |
| 6,414,304 B1 | 7/2002 | Boess et al. |
| 6,424,411 B1 | 7/2002 | Rapidel et al. |
| 6,559,936 B1 * | 5/2003 | Colombo et al. ........ 356/139.09 |
| 6,657,711 B1 * | 12/2003 | Kitagawa et al. ............ 356/155 |
| 2002/0041698 A1 * | 4/2002 | Ito et al. ...................... 382/103 |
| 2002/0189115 A1 * | 12/2002 | Jackson et al. ................ 33/286 |

(Continued)

FOREIGN PATENT DOCUMENTS

WO 0177617 10/2001

*Primary Examiner*—Thomas H Tarcza
*Assistant Examiner*—Timothy A Brainard
(74) *Attorney, Agent, or Firm*—Polster, Lieder, Woodruff & Lucchesi, L.C.

(57) ABSTRACT

A vehicle wheel alignment sensor for a machine-vision vehicle wheel alignment system comprising a scanned beam camera incorporating an illumination source, a means for deflecting light emitted by the illumination source along a path within a field of view, and a detector array for receiving illumination reflected from objects within the field of view to generate an image which is representative of a region of interest within the field of view.

15 Claims, 7 Drawing Sheets

U.S. PATENT DOCUMENTS

| | | | |
|---|---|---|---|
| 2003/0043387 A1* | 3/2003 | Lim et al. | 356/605 |
| 2003/0187610 A1* | 10/2003 | Dorrance et al. | 702/151 |
| 2004/0246470 A1* | 12/2004 | Burns et al. | 356/139.09 |
| 2005/0020926 A1* | 1/2005 | Wiklof et al. | 600/476 |
| 2005/0195383 A1* | 9/2005 | Breed et al. | 356/4.01 |

* cited by examiner

VEHICLE WHEEL ALIGNMENT SYSTEM SCANNED BEAM IMAGING SENSOR

CROSS-REFERENCE TO RELATED APPLICATIONS

The present application is related to, and claims priority from, U.S. Provisional Patent Application No. 60/664,748 filed on Mar. 24, 2005, which is herein incorporated by reference.

STATEMENT REGARDING FEDERALLY SPONSORED RESEARCH

Not Applicable.

BACKGROUND OF THE INVENTION

The present invention relates to imaging sensors utilized in conjunction with a vehicle wheel alignment system to acquire data with are either representative of vehicle wheel alignment angles, or from which vehicle wheel alignment angles can be calculated, and in particular, to an improved machine vision vehicle wheel alignment sensor incorporating a scanned beam imaging system to generate an image associated with a vehicle wheel from which alignment angle information can be determined.

Aligning vehicle wheels within specific tolerances is important for optimal control of the vehicle and for consistent wear of the tires. Alignment is performed primarily by adjusting camber, caster, toe, and steering axis inclination. As part of calculating the alignment angles for the vehicle, the angles of the wheels must be determined. The angles can be determined relative to an external reference, such as found in machine vision systems, or relative to the other wheels, such as found in wheel-mounted systems. It is known that these angles can be measured using an electro-optical transducer that incorporates a solid state detector array. In the case of machine vision systems, the detector array may have multiple columns and rows forming an area to capture a two-dimensional image, and in the case of wheel-mounted systems, the detector array may only need to be linear, having a single row with as few as two receptor elements. In either case, the image on the detector must be analyzed meticulously so that accurate alignment angles can be calculated.

Wheel-mounted alignment systems typically have sensor heads on each wheel of the vehicle, and each sensor head has an emitter and a receiver that works in combination with at least one other sensor head along the vehicle's sides and across the vehicle. The receiver units may have photodiodes as set forth in U.S. Pat. No. 4,302,104 or a charge coupled device (CCD) as set forth in U.S. Pat. Nos. 5,018,853 and 5,519,489, and the emitter units may have a single source as in U.S. Pat. Nos. 4,302,104 and 5,018,853 or multiple sources as in U.S. Pat. No. 5,488,471. Angles and distances are calculated according to the positions of the spots or lines that are detected by the linear arrays.

Machine vision vehicle wheel alignment systems typically use a solid state camera with an array detector mounted away from the vehicle to obtain an image of a wheel mounted target. The target incorporates an accurately reproduced pattern that has known control features, as set forth in U.S. Pat. No. 6,064,750. The position of the features in the image are found and the orientation of the wheel can be calculated by well known algorithms. Some machine vision systems do not use a predefined target but identify either random or predetermined geometric features directly on the wheel or tire of a wheel assembly, such as projected light stripes or the circular wheel rim, and use the distortion of the geometry to determine positions and orientations.

In wheel alignment systems, the imaging requirements of the optical sensors are somewhat different than those of a standard camera. Very precise measurements must be made at a rate of at least 2 Hz. on static or very nearly static scenes. This requires stable low-noise images. The accuracy of the measurement depends on the precision with which image features such as edges, centroids, corners, lines or boundaries can be determined. Methods for analyzing the image obtained using a standard area imaging sensor must take into account the possible sources of inaccuracy and compensate for them.

Standard area imaging sensors suffer from a number of restrictions when utilized in an automotive service environment. A typical standard area imaging sensor utilizes a fixed focal length lens assembly to acquire images of a field of view which is sufficiently large enough to accommodate the varied positions of vehicle wheels associated with different types of vehicles. The region of interest which represents a vehicle wheel or alignment target within the field of view generally corresponds to only a small portion of the acquired image, and accordingly, comprises less than the maximum possible number of image pixels. Additionally, standard area imaging sensors are susceptible to specular reflection problems, such as may arise when bright lights are reflected from shiny or chromed surfaces of a vehicle or vehicle wheel rim.

In contrast to a standard area imaging sensor or camera, a scanned beam imaging system or laser camera can selectively image a region of interest within a field of view, provides adjustable image resolution for the region of interest, and is less susceptible to specular reflection problems. A scanned beam imaging system obtains an image by scanning a laser spot or other form of illumination across area region of interest within a field of view, and detecting the light reflected back to the imaging system from the illuminated surfaces. The image generated by a scanned beam camera is built up by associating the measured properties of the reflected light with the direction of the incident illumination at many points over time. For example, if a laser spot is swept over an area in a raster pattern and the intensity of the reflected light is recorded at discrete points in the raster, a two-dimensional image similar to that acquired by a standard camera can be built up from the individual points or pixels.

Scanned beam cameras have a number of advantages over conventional area imagers used in alignment systems. For example, a scanned beam camera is well suited for close-up imaging. The scanned beam camera combines bright target illumination with a small aperture to obtain a large depth of focus. While the "shutter speed" for a single frame acquired by a scanned beam camera may be the same as that of a conventional area imaging camera, for individual pixels the scanned beam camera is thousands of times faster. In effect, the scanned beam camera is acquiring millions of individual pictures each second, so motion blur is virtually eliminated.

With a scanned beam camera, there is no image distortion caused by light passing through glass lenses. The illuminating light or laser beam is generally steered with a mirror to define the location of the pixels in the acquired image. Reflected light is generally collected by a detector with a lens on it, but this lens is used only to concentrate light from an area onto a single high speed light sensor or receptor. Light wavelength and rate of signal intensity change are used to identify the reflected light, not a location on a two-dimensional imaging array.

The image resolution of a scanned beam camera can be varied by changing the frequency at which the reflected light is sampled, and by changing the distance between adjacent scan lines illuminating a region of interest within a field of view. This can allow for fast searches of a large field of view at a low image resolution, to identify the location of a desired target or region of interest in the field of view, and facilitates accurate tracking of the desired target with a higher resolution in a selected region of interest once the target has been located. This is similar to decimation and sub-windowing on CMOS-type area image sensors currently used in existing machine-vision vehicle wheel alignment systems, but has fewer limits on the allowable resolutions. For example, this feature of a scanned beam camera bypasses one of the basic limits of conventional array imagers, i.e., the number of pixels physically disposed on the imager sensor.

Scanned-beam cameras also offer another unique feature called confocal imaging. The basic principle of confocal imaging is that the scanned illumination beam can be manipulated in three dimensions (x, y, and z axis) and filtered back through a tiny aperture so that three-dimensional objects under very high magnification remain in sharp focus because they are not blurred by the reflected light bouncing back to the receiver at different angles from different depths. Confocal imaging has found application in specialized medical, scientific, or industrial imaging where a combination of high magnification and high resolution are desired, but has not been adopted for use in vehicle service applications.

Machine vision wheel alignment system designs currently trade off between the size of the field of view and image accuracy. Even with the trend to incorporate more pixels on conventional image sensors, this trade off makes some aspects of machine vision wheel alignment system designs impractical. Scanned beam camera "zooming" or viewing of a selected region of interest within the field of view at a high resolution can go beyond this limit by allowing a large or full field of view to be used for target searches, then "zooming" or selectively viewing an identified region of interest or target utilizing substantially the entire photosensitive surface of the imager to obtain a locally high image resolution. The effect is equivalent to providing an image sensor with a very large number of pixel elements, most of which are not utilized when viewing a limited area or region of interest One difference between conventional image sensors and scanned beam cameras is the pixel configurations. On a conventional image sensor, each pixel is configured as a roughly rectangular sensor element that integrates the received light. In the scanned beam camera, the illuminated region configuration determines the effective pixel configuration. To take maximum advantage of the variable zoom and resolution, the illuminated region size can, and should, be adjusted so that it is comparable to the spacing between adjacent illumination raster scan lines of an image.

The depth of field in a scanned beam camera is superior to that of a conventional image sensor because of the removal of most focusing optics. With conventional image sensors, the focusing optics impose physical design limits which restricts possible configurations of vision-based aligners.

In contrast to conventional image sensors, undesired specular reflections are reduced, because the scanned beam camera ignores light from sources other than the associated illuminating light source, such as a laser.

Similarly, ambient light problems commonly found in images acquired by conventional image sensors are reduced when a scanned beam or scanned beam camera is utilized, because the scanned beam camera ignores slowly changing light sources, like sunlight, and because the scanned beam camera ignores light from sources other than the illuminating light source, such as a laser.

There are a number of commercial systems currently available which utilize a scanned beam camera technique to gather image data. These systems generally employ rotating mirrors to steer the illuminating light or laser beam, and are not well suited for use in automotive aligner applications because they are relatively expensive, delicate, and require significant maintenance. Micro-electromechanical (MEMS) mirror based scanned beam camera designs which replace the rotating mirrors with controlled arrays of tilting mirrors, have recently been announced. While not currently utilized in any automotive service applications, a MEMS mirror based scanned beam camera could potentially reduce the cost, and increases the reliability, of a scanned beam camera system, and render such systems practical for use in an automotive alignment system.

During operation, the MEMS mirror is selectively controlled to direct an illuminating light source to sequentially illuminate each pixel in a field of view. Light reflected from the illuminated pixel is gathered, often through a large numerical aperture, and converted to electrical signals using a photodetector. Beam angle sensor technology may be used to correlate the sequence of reflectance values to specific pixel locations, thus creating a digital image of the field of view. Images collected may be monochromatic, color, and even infrared, depending on light sources and detectors used. The image produced by a MEMS-based scanned beam camera is a two-dimensional raster image similar to that produced by an imager chip in most aspects. Compared to alternative imaging technologies, MEMS mirror based scanned beam cameras offer greater depth of field, reduced motion blur, enhanced resolution, extended spectral response, reduced cost, reduced size, lower power consumption, and improved shock and vibration tolerance.

Alternative configurations of scanned beam cameras measure the time-of-flight property of the light from the light source or laser emitter to the scanned beam camera sensor, and calculate associated distance information for each discrete image pixel. These systems are commonly utilized for reverse engineering sculptured parts or capturing artwork, and utilize a rotating mirror system to produce raster patterns or spiral patterns. These systems could be modified to utilize a MEMS mirror system in place of the rotating mirror system.

The illuminating light source or laser beam used by a scanned beam camera system can be a combination of a number of different illumination sources, each having a different color. Combining red, blue, and green light sources or lasers results in a visible color image comparable to that produced by a conventional color imager sensor. Light frequencies outside the normal RGB space used in commercial cameras can also be used, allowing a larger color space to be produced that has advantages in identifying specific surfaces, such as rubber. This approach also allows the use of 4 or more beam colors, which has a similar advantage in identifying surfaces that may selectively reflect narrow color bands, such as rubber or road dust.

In addition to the aforementioned advantages of scanned beam cameras, a multi-color scanned beam camera system shares a key characteristic with a Foveon color imager sensor: the three or more colors levels associated with each pixel in an image are measured at the same point in the image. This allows higher resolution, and allows the many advantages of a high resolution color camera to be attained. Light from multiple light sources can be detected in parallel by multiple detectors, each with their own bandpass filter.

Although scanning scanned beam camera systems have not been adapted for use in the generally harsh vehicle service environment, it would be advantageous to provide a vehicle wheel alignment system with an imaging sensor utilizing a scanned beam camera or imaging system in place of a conventional area imaging camera or sensor to utilize the advantages in resolution and flexibility offered by a scanned beam camera system.

BRIEF SUMMARY OF THE INVENTION

Briefly stated, in one embodiment, the present invention provides a machine vision vehicle wheel alignment system with an improved imaging sensor utilizing a scanned beam camera system in place of a traditional area camera to acquire images associated with a vehicle for purposes of determining vehicle characteristics such as wheel alignment angles.

In an alternate embodiment, the present invention provides a machine vision vehicle wheel alignment system with an improved imaging sensor having variable image resolution, and which is capable of scanning a field of view at high speeds with a low resolution to identify a region of interest or predetermined target, and subsequently scanning a selected portion of the field of view at a high resolution to acquire detailed images of the identified region of interest or predetermined target.

In an alternate embodiment, the present invention provides a machine vision vehicle wheel alignment system with an improved imaging sensor having a variable field of view which is independent of the number of pixel elements physically present on the imaging sensor.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Machine vision vehicle wheel alignment systems such as shown in U.S. Pat. No. 6,298,284 B1 to Burns, Jr. et al., herein incorporated by reference, typically utilize a set of solid state cameras having traditional area imaging sensors, mounted away from a vehicle undergoing an alignment inspection, to obtain images of wheel-mounted alignment targets. As is conventional in the field of machine vision vehicle wheel alignment systems, the alignment targets incorporate accurately reproduced patterns and/or known control features, as set forth in U.S. Pat. No. 6,064,750 to January et al., herein incorporated by reference. The positions of the features in the images are determined by a processing system using well known geometric relationships and mathematical algorithms, from which the position and orientation of the wheels or other vehicle component associated with each alignment target are identified.

Some machine vision vehicle wheel alignment systems do not use predefined alignment targets mounted to the vehicle wheels or components, but rather process images to identify objects such as either random or predetermined geometric features directly on the wheel, tire of a wheel assembly, or vehicle component, such as projected light stripes or geometric features. These systems typically use distortion or changes in the observed geometry to determine positions and orientations from which position and orientation measurements or wheel alignment data can be determined.

Figure 1:
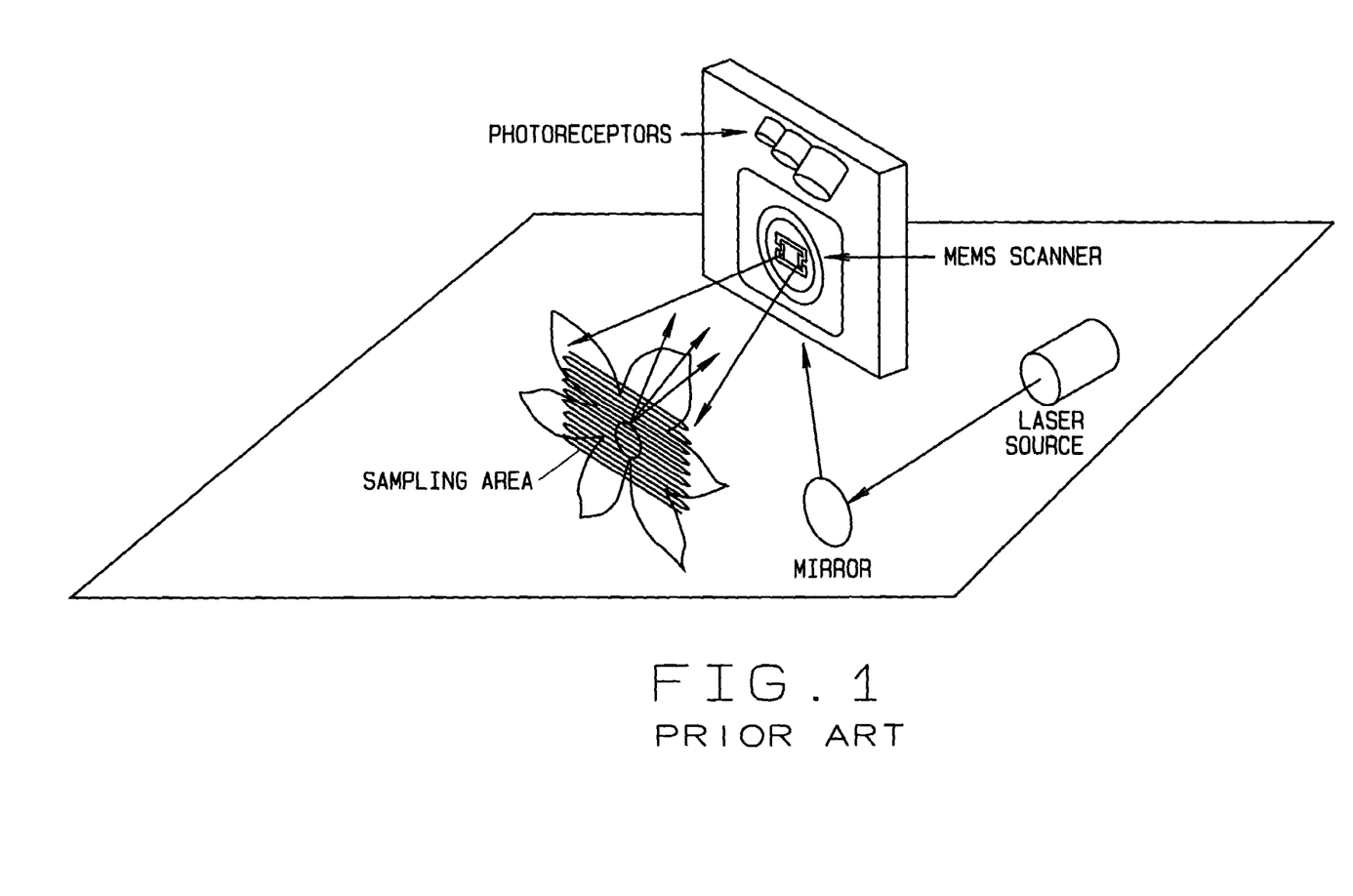
FIG. 1 is a prior art illustration of the operation of a scanned beam camera system.
Figure 2:
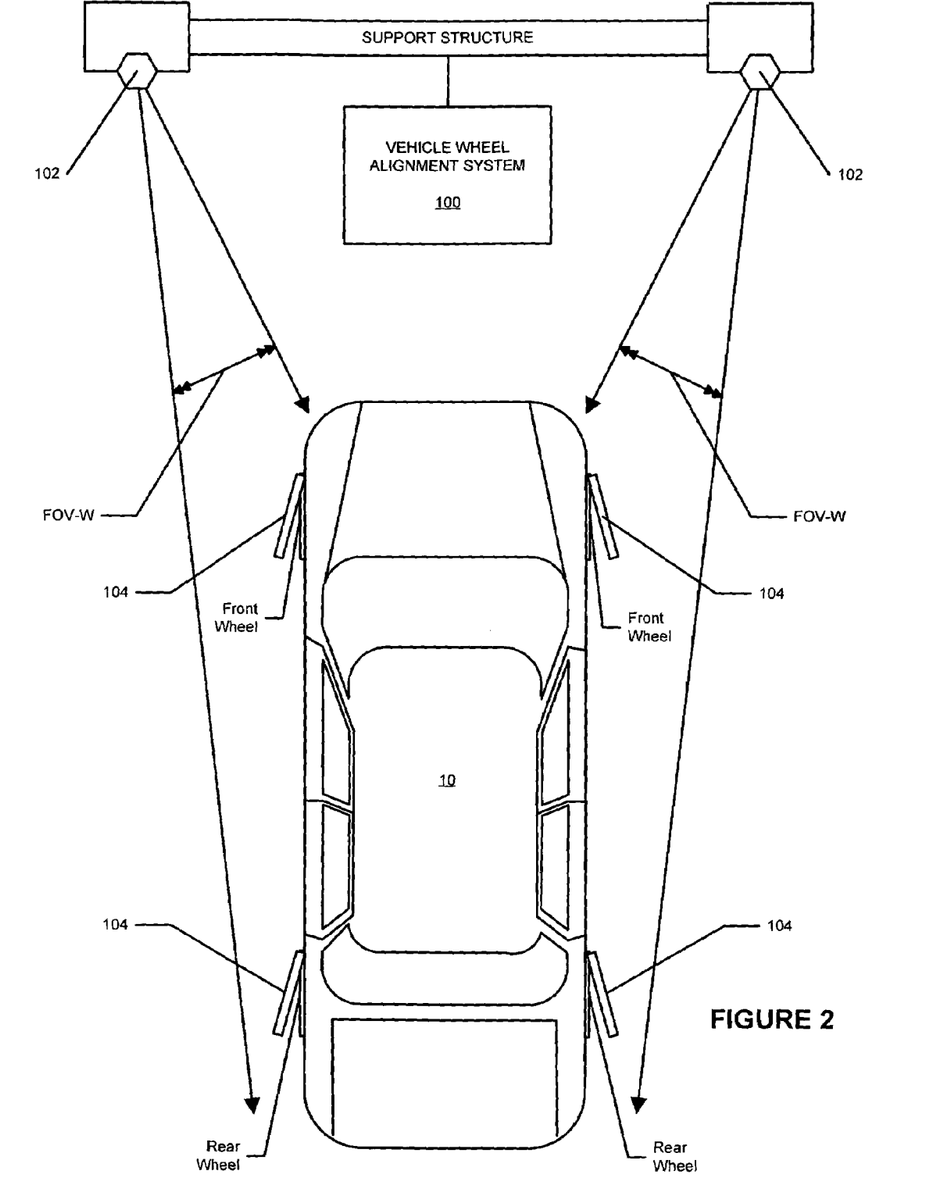
FIG. 2 is an illustration of a vehicle wheel alignment system utilizing scanned beam camera sensors of the present invention initially viewing wide fields of view to locate alignment targets.
Figure 3:
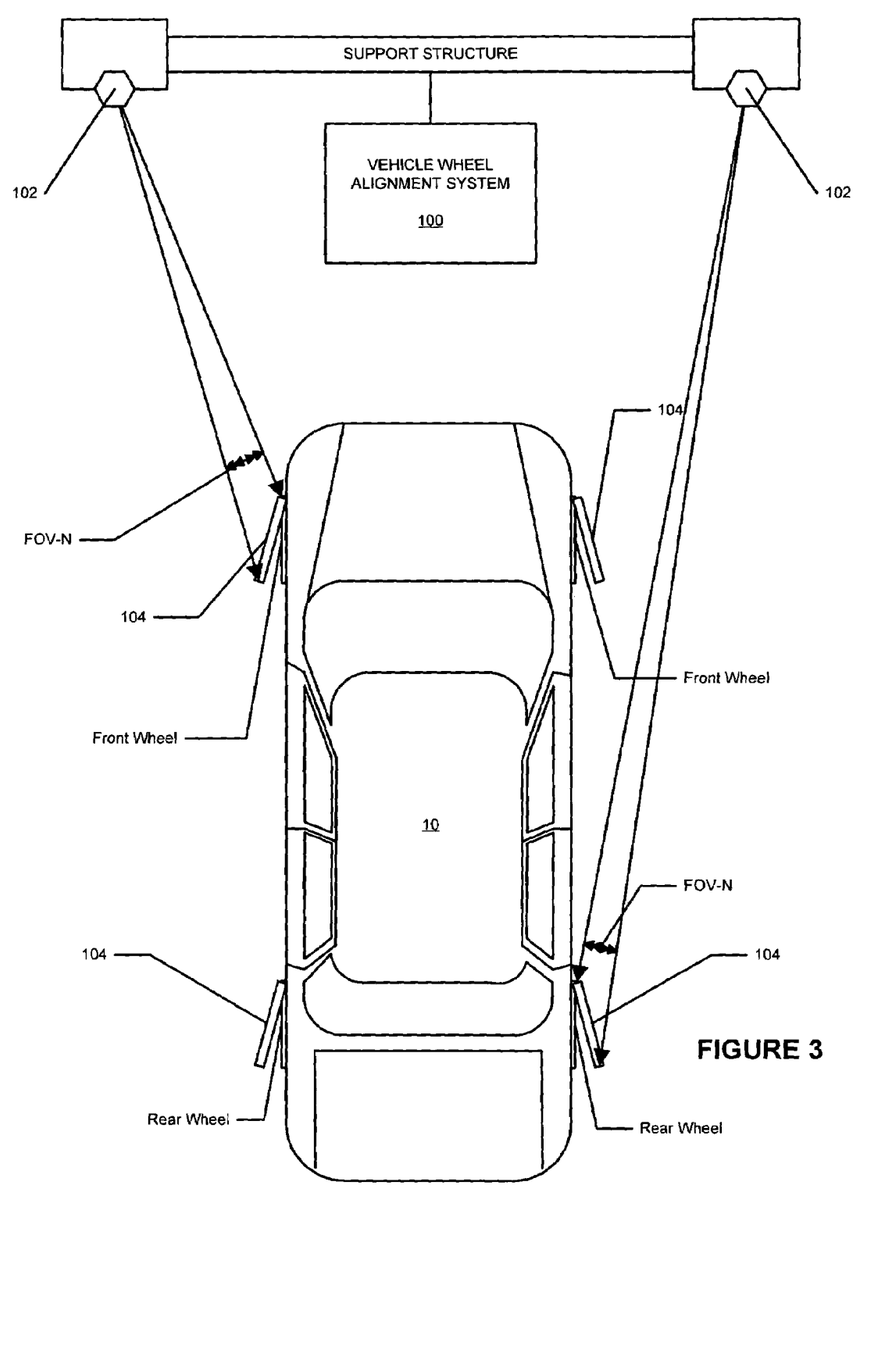
FIG. 3 is an illustration of the wheel alignment system of FIG. 2 utilizing the scanned beam camera sensors with selectively narrowed fields of view to acquire images of regions of interest associated with front and rear alignment targets.

In an embodiment of the present invention, such as shown in FIGS. 2 and 3, a machine vision vehicle wheel alignment system 100 is provided with a set of scanned beam cameras 102 in place of the traditional solid state cameras having area-imaging sensors to acquire multi-dimensional images of illuminated objects such as alignment targets 104 associated with the wheels or surfaces of a vehicle 10. In addition to positional information, these multi-dimensional images may optionally include supplemental image data for each pixel comprising the image, such as range data, or illumination data such as brightness, color, and reflection characteristics as described below.

Figure 4:
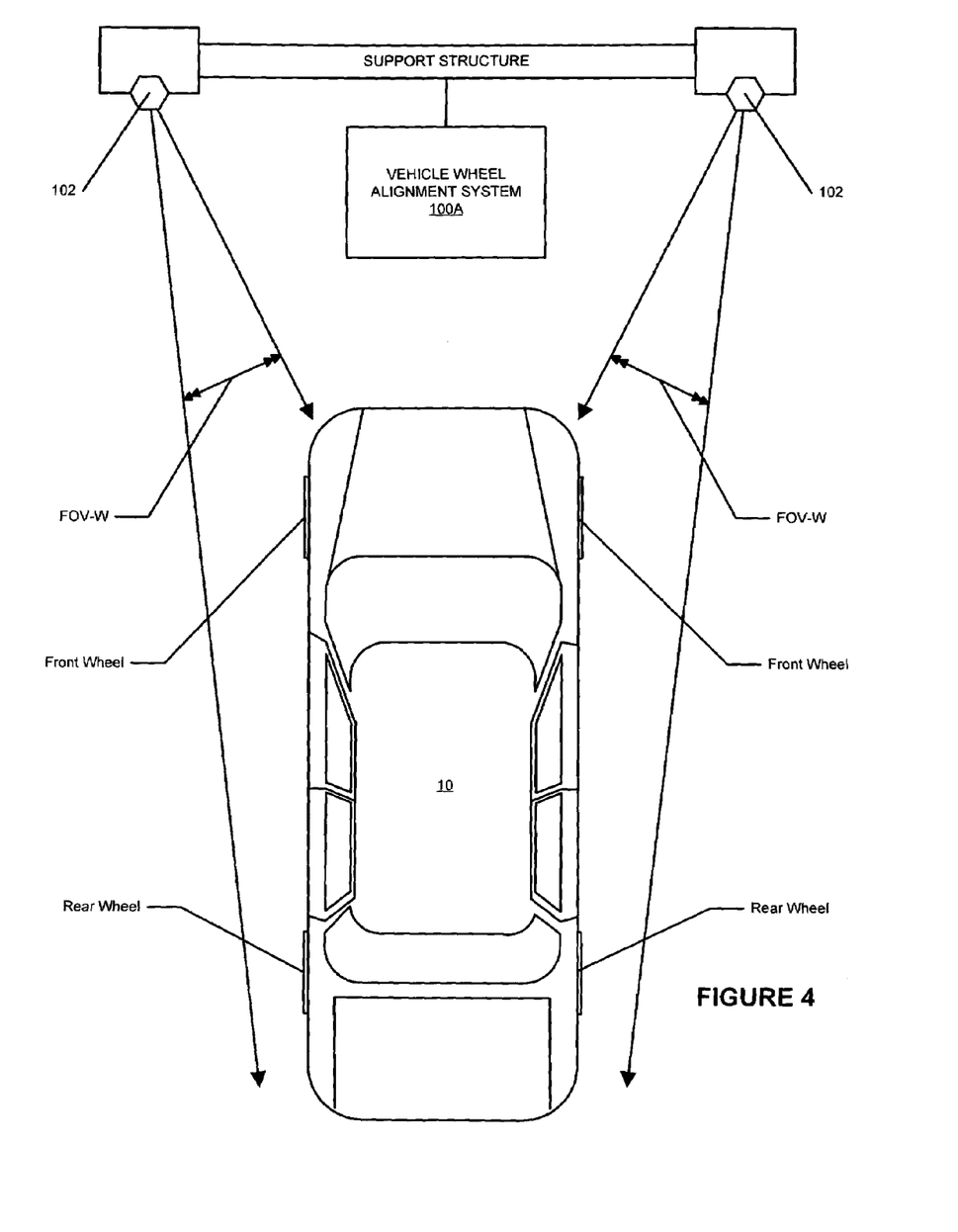
FIG. 4 is an illustration of an alternate embodiment vehicle wheel alignment system utilizing scanned beam camera sensors of the present invention initially viewing wide fields of view to locate vehicle wheel features.
Figure 5:
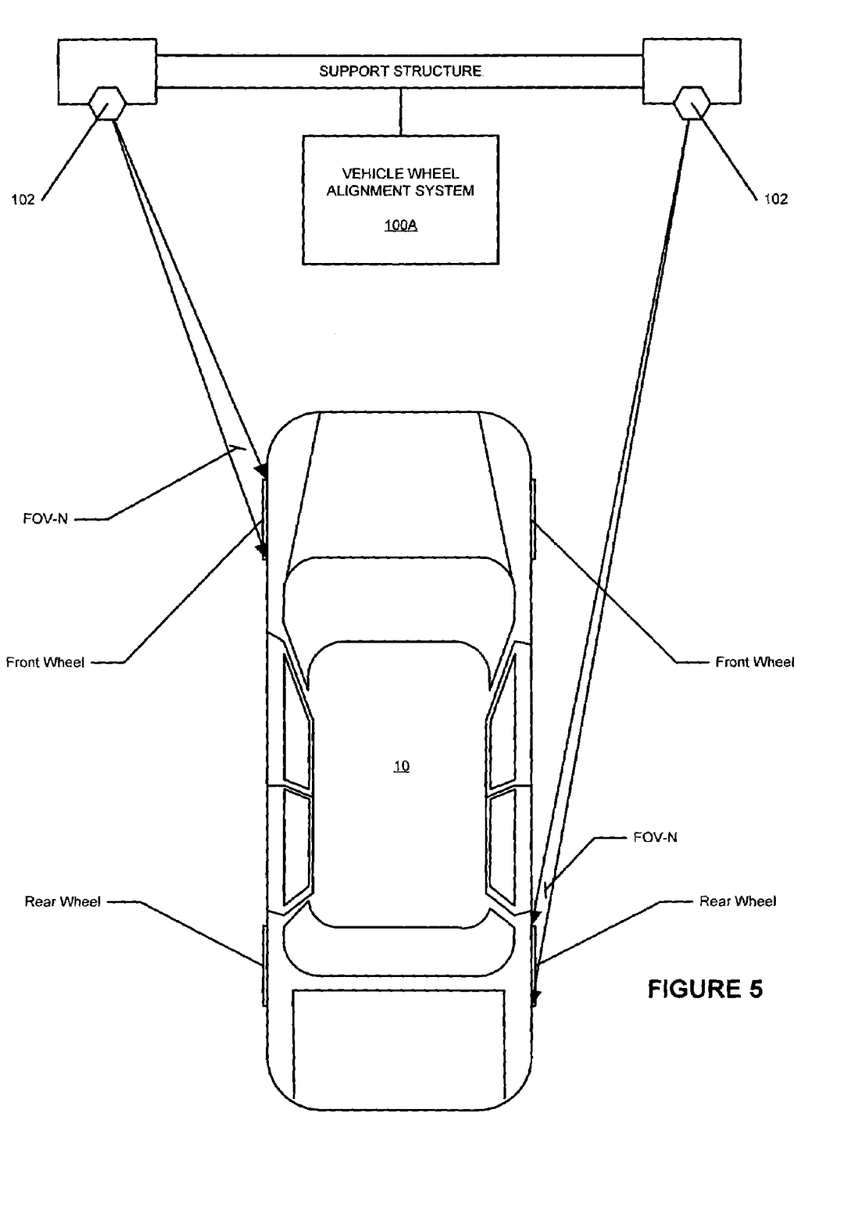
FIG. 5 is an illustration of the alternate embodiment wheel alignment system of FIG. 4 utilizing the scanned beam camera sensors with selectively narrowed fields of view to image regions of interest associated with front and rear vehicle wheels.

The scanned beam camera sensors 102 can be used to capture high resolution images of an alignment target 104 mounted to a vehicle wheel assembly. For alternate designs of the vehicle wheel alignment system 100A which do not rely upon alignment targets 104, scanning beam camera sensors 102 can provide images of sufficient resolution to yield accurate points directly on the surfaces of the vehicle or vehicle wheels, as shown in FIGS. 4 and 5, which can be used to determine precise component or wheel positions, and subsequently, vehicle alignment parameters or vehicle characteristics.

Image resolution can be varied by changing the frequency at which the reflected light is sampled by the scanned beam cameras 102, and by changing the distance between adjacent projected raster pattern scan lines which illuminate the surface of the alignment target 104 or surface of the vehicle 10. This allows faster searches at a low resolution to identify an alignment target 104 or wheel assembly in a wide field of view FOV-W, as shown in FIGS. 2 and 4, and enables accurate tracking of an identified alignment target 104 or features on a wheel assembly in a narrow field of view FOV-N or selected region of interest with a higher resolution once the alignment target 104 or desired vehicle surface is identified, as shown in FIGS. 3 and 5. This is similar to decimation and sub-windowing on prior art CMOS-type image sensors used on currently available machine-vision vehicle wheel alignment systems, but has fewer limits on the allowable resolutions.

By using a scanned beam camera 102 with multiple illumination sources, each having a different color of light, in place of a conventional area imaging wheel alignment system sensor, additional combinations of identifying marks and reference points can be generated for various targets and observed vehicle surface features utilizing the techniques described in co-pending U.S. patent application Ser. No. 10/397,345 to Dorrance et al. published as U.S. Patent Application Publication 2003-0187610, herein incorporated by reference. A scanned beam camera 102 configured with one or more illumination sources tuned to infrared and/or ultraviolet frequencies can also be used to gain advantages in wheel alignment system performance in the same manner as different color visible illumination sources. For example, illuminating ultraviolet frequencies that would be blocked from the imaging components by conventional optical components, such as focusing lenses, can be accurately directed by a scanned beam camera mirror, and can strike an alignment target 104, wheel assembly, or vehicle surface coated with fluorescent material. The resulting visible light can then be detected by the imaging components of the scanned beam camera 102 and utilized in determining vehicle wheel alignment angle measurements or other characteristics.

This is particularly useful for vehicle wheel alignments systems 100A which do not rely upon the mounting of an alignment target 104 to a vehicle wheel or surface, but rather, obtain images of either predetermined or random features on the surface of the vehicle or vehicle wheel assembly, and utilize those features to calculate alignment angle measurements or characteristics. In particular, it may be necessary to apply markings to the vehicle wheel assembly or vehicle surfaces which can be easily identified by the imaging sensors associated with the scanning cameras 102. Utilizing a fluorescent material which is generally invisible to a human observer unless illuminated with ultraviolet radiation is ideal for applications where it is not desirable, such as for appearance sake, to provide a normally visible mark on a vehicle or wheel assembly surface.

The use of a scanned beam camera 102 as a sensor for a vehicle wheel alignment system 100 or 100A provides further advantages when acquiring images of vehicle wheel assemblies having highly polished and/or reflective surfaces. When such surfaces are illuminated with a conventional flash or illumination system associated with an area-imaging camera or sensor, specular reflection such as from ambient light sources is likely to be present in the resulting images. Since the scanned beam cameras 102 preferably provides a point source of illumination, i.e. a laser beam, which traverses the region of interest within the field of view, specular reflections from highly polished and/or reflective surfaces are significantly reduced in the acquired images.

Figure 6:
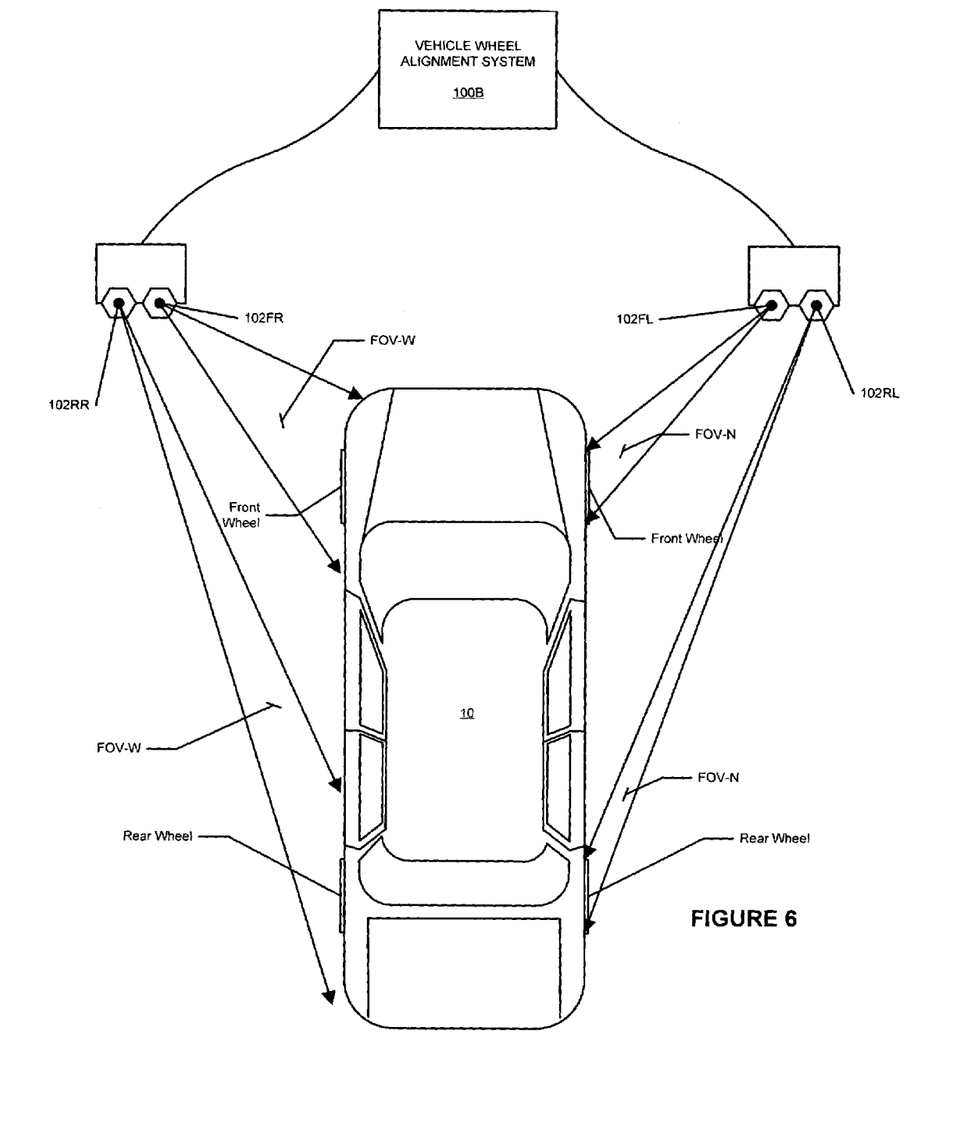
FIG. 6 is an illustration of an alternate embodiment vehicle wheel alignment system utilizing independent pairs of scanned beam camera sensors of the present invention with selective fields of view to locate wheel features and acquire images thereof.

While the embodiments of the vehicle wheel alignment systems illustrated in FIGS. 2-5 illustrate the use of only one scanned beam camera sensors 102 for each side of the vehicle 10, those of ordinary skill in the art will recognize that the scanned beam camera sensors 102 may be utilize in a wide variety of vehicle wheel alignment system configurations, in substantially the same configurations as are found with area-imaging camera sensors. For example an embodiment shown in FIG. 6 illustrates a vehicle wheel alignment system 100B configured with two independently disposed camera systems linked to a processing system, one configure to view the left side of the vehicle with a pair of scanned beam cameras 102FL, 102RL, and one to view the right side of the vehicle with a second pair of scanning beam-beam cameras 102FR, 102 RR. The field of view for each scanned beam camera 102FL, 102RL, 102FR, and 102RR are adjustable between a wide field of view (FOV-W) for locating objects, and a narrow field of view (FOV-N) or selected region of interest within the wide field of view for acquiring higher resolution images of located objects.

A machine vision aligner 100, 100A, 100B can measure the pose of an automobile's wheel if it can determine the three-dimensional location in space of numerous points on the wheel surfaces. It is well known that such three-dimensional point data can be obtained from a stereo pair of cameras via a technique known as triangulation. An alternate embodiment of the machine vision vehicle wheel alignment system 200 of the present invention, shown in FIG. 7, achieves similar results using one scanned beam camera 202 and one area-imaging camera 204, mounted together with a known physical spacing. The scanned beam camera 202 is calibrated so that the projected laser beam or illumination source can be precisely directed in any direction within a scan range. While the scanning mirror of the scanned beam camera 202 is commanded to direct the illuminating laser or light source through a series of movements that intersect a vehicle wheel surface, each image acquired by the area-imaging camera 204 simultaneously yields the three-dimensional coordinates of an illuminated region on the wheel surface.

Figure 7:
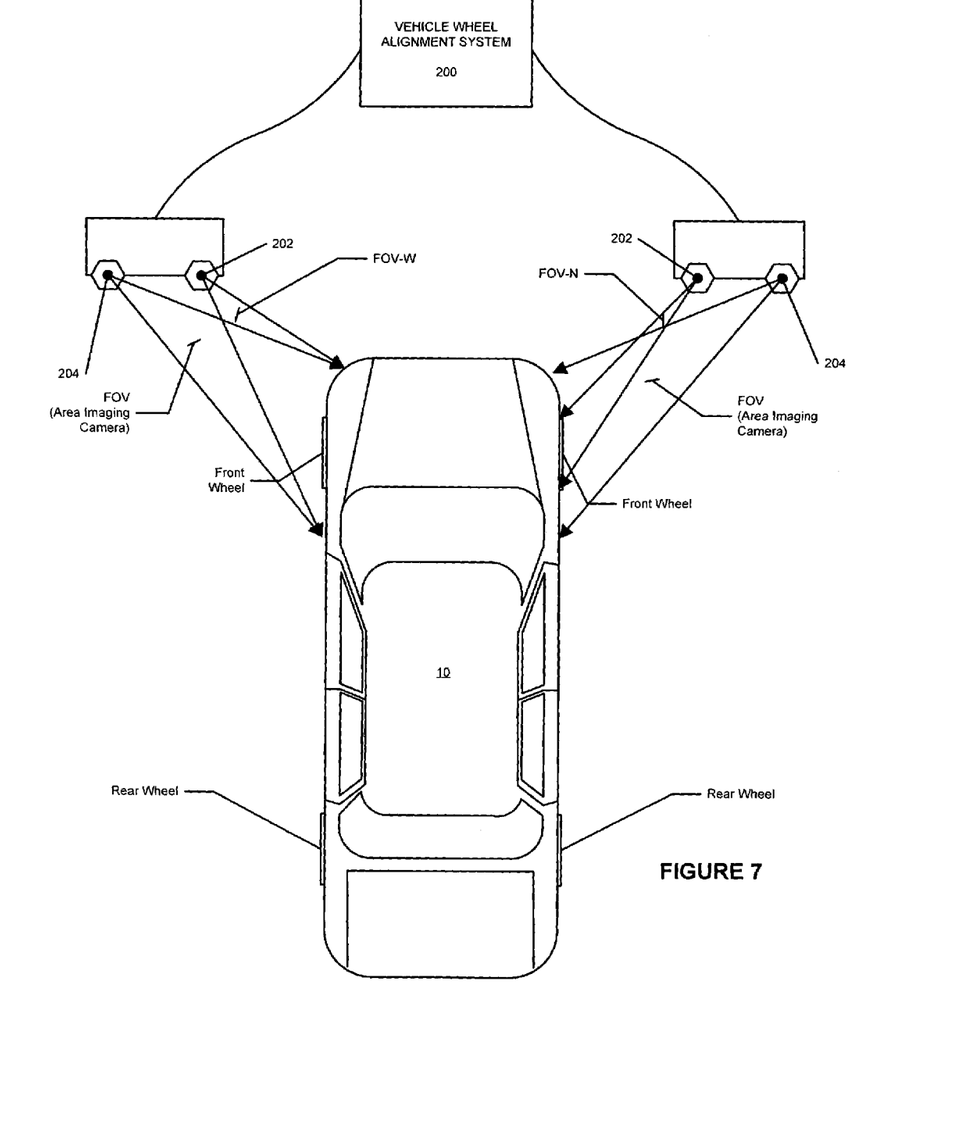
FIG. 7 is an illustration of an alternate embodiment vehicle wheel alignment system utilizing a scanned beam camera sensor in conjunction with an area imaging camera on each side of a vehicle to locate wheel features and acquire images thereof.

The computations carried out by a processor associated with the vehicle wheel alignment system 200 involve solving for the dimensions of a triangle formed by three points in space. The three points are defined by (1) the location (and orientation) of the illumination directing mirror of the scanned beam camera 202, (2) the lens of the scanned beam camera 202 and (3) the point on the wheel or vehicle component surface which is intersected by the projected laser beam or illuminating light.

In an alternate embodiment the area-imaging camera can acquire an image of the illuminated area, and the two images can be processed as stereoscopic images to find common points in both image that can be located in three dimensions by stereo triangulation methods. An advantage of this approach includes the ability to synchronize the acquisition of the two images at one point in time by using the scanned beam as a flash illuminator, and the elimination of the requirement for a separate light source for the area-imaging camera.

Those of ordinary skill in the art will recognize that within the various embodiments of the present invention, the scanned beam cameras 102 and 202 may incorporate mirror assemblies which are moved by the use of traditional galvanometer techniques, but may also benefit from the use of mirror assemblies incorporating MEMS technology.

The present invention can be embodied in-part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A machine-vision vehicle wheel alignment system having a processing system and at least one sensor for acquiring image data associated with a vehicle, the sensor operatively coupled to the processing system to communicate acquired image data there to, the comprising:

wherein the at least one sensor is a scanned beam camera having at least one controlled source of directed illumination, said controlled source of illumination configured to selectively illuminate a region of interest on a stationary object associated with a vehicle by projecting an illuminated point within said region of interest to traverse over a selected pattern, and at least one detector means for receiving light reflected from said illuminated object at a plurality of discrete sample intervals during the traversing movement of the illuminated point within said region of interest, to acquire a plurality of associated image pixels defining a multi-dimensional image of said illuminated region of interest on said object;

wherein said at least one imaging sensor is configured to illuminate a first region of interest within a field of view to facilitate detection of an object within said field of view by the processing system; and wherein said at least one imaging sensor is further configured to respond to instructions from said processing system following detection of said object within said field of view by the processing system to selectively illuminate a second region of interest within said unaltered field of view, said second region of interest being smaller than said first region of interest and encompassing said object.

2. The improved machine-vision vehicle wheel alignment system of claim 1 wherein said at least one sensor is configured to alter a resolution of said image by altering a frequency at which the said reflected light is sampled by the said detector means to generate individual pixels which form said image.

3. The improved machine-vision vehicle wheel alignment system of claim 1 wherein said selected pattern is a raster pattern comprising a plurality of adjacent scan lines; and wherein said at least one sensor is further configured to alter a distance between said adjacent scan lines illuminating said region of interest within said field of view.

4. The improved machine-vision vehicle wheel alignment system of claim 1 wherein said selected pattern is a raster pattern comprising a plurality of adjacent scan lines; and wherein said at least one sensor is configured to alter said raster pattern of the said directed illumination.

5. The improved machine-vision vehicle wheel alignment system of claim 1 wherein said selected pattern is a raster pattern comprising a plurality of adjacent scan lines; and wherein said at least one sensor is configured to alter a rate of said scanning movement of the illuminated point across each of said scan lines to alter the density of acquired image pixels.

6. The improved machine-vision vehicle wheel alignment system of claim 1 wherein said illuminated object includes at least one object in a set of objects including an alignment target, a vehicle wheel assembly, and a vehicle component surface.

7. The improved machine-vision vehicle wheel alignment system of claim 1 wherein said controlled source of illumination within said scanned beam camera includes a MEMS mirror system for selectively directing an illumination source to illuminate a region of interest within a field of view.

8. The improved machine-vision vehicle wheel alignment system of claim 1 further including at least one area-imaging camera configured to operate in synchronized conjunction with said at least one scanned beam camera, said area-imaging camera capturing an image of a field of view including a region illuminated by said at least one scanned beam camera.

9. The improved machine-vision vehicle wheel alignment system of claim 1 wherein said multi-dimensional image comprises an array of image pixels and associated range data for each of said image pixels.

10. The improved machine-vision vehicle wheel alignment system of claim 1 wherein said multi-dimensional image comprises an array of image pixels and associated illumination data for each of said image pixels.

11. A method for acquiring images associated with a vehicle in a machine-vision vehicle wheel alignment system having a processing system and at least one imaging sensor operatively coupled to the processing system to communicate acquired image data there to, comprising:

controlling a source of directed illumination to selectively illuminate points on at least one stationary object within a first region of interest within a field of view of the imaging sensor by directing a point illuminating beam of light over a scan pattern within said first region of interest;

receiving, at the imaging sensor, reflected light from discretely illuminated points on said at least one stationary object within said field of view, each of said discretely illuminated points defining a discrete image pixel;

generating a composite image of said discrete image pixels representative of said selectively illuminated at least one object within said first region of interest within said field of view; and responsive to an evaluation of said image by said processing system, controlling said source of directed illumination to selectively illuminate a second region of interest within said first region of interest, from which to receive reflected light for the generation of a second composite image representative of one or more illuminated objects within said second region of interest.

12. The method of claim 11 for acquiring images associated with a vehicle in a machine-vision vehicle wheel alignment system wherein controlling said source of directed illumination to illuminate said second region of interest includes altering a boundary of an illuminated region of interest within a field of view of the imaging sensor.

13. The method of claim 12 for acquiring images associated with a vehicle in a machine-vision vehicle wheel alignment system wherein an image resolution of said generated images remains constant following said alteration of said boundary of said illuminated region of interest.

14. The method of claim 11 for acquiring images associated with a vehicle in a machine-vision vehicle wheel alignment system wherein an image resolution of each of said generated images is responsive to a sampling frequency of said imaging sensor.

15. The method of claim 11 for acquiring images associated with a vehicle in a machine vision vehicle wheel alignment system further including the step of determining a distance measurement associated with each pixel element of said generated image.

* * * * *